United States Patent [19]

Bahadir et al.

[11] 4,302,567
[45] Nov. 24, 1981

[54] PROCESS FOR THE HOMO- AND CO-POLYMERIZATION OF α-OLEFINS

[75] Inventors: Müfit Bahadir, Dinslaken; Wolfgang Payer, Wesel, both of Fed. Rep. of Germany

[73] Assignee: Ruhrchemie Aktiengesellschaft, Oberhausen, Fed. Rep. of Germany

[21] Appl. No.: 198,893

[22] Filed: Oct. 20, 1980

[30] Foreign Application Priority Data

May 29, 1980 [DE] Fed. Rep. of Germany ....... 3020316

[51] Int. Cl.$^3$ ............................................... C08F 4/64
[52] U.S. Cl. ............................... 526/159; 252/429 A; 252/427 B; 526/162; 526/348.2; 526/348.3; 526/348.5; 526/907; 526/908

[58] Field of Search ................................. 526/159, 907

[56] References Cited

U.S. PATENT DOCUMENTS 2,968,652  1/1961  Mertes ................................. 526/159

*Primary Examiner*—Stanford M. Levin
*Attorney, Agent, or Firm*—Sprung, Felfe, Horn, Lynch & Kramer

[57] ABSTRACT

A catalyst for the polymerization of olefins is described wherein a titanium(IV) compound is reduced with an organoaluminum compound in the presence of atactic poly-α-olefin. Polymerization with the catalyst is also disclosed.

3 Claims, No Drawings

PROCESS FOR THE HOMO- AND CO-POLYMERIZATION OF α-OLEFINS

BACKGROUND OF THE INVENTION

1. Field of the Invention

The present invention relates to a process for the production of homo- and co-polymers of α-olefins with the aid of catalyst systems containing microcrystalline titanium(III) compounds.

2. Discussion of Prior Art

The polymerization of α-olefins to the corresponding homo- and co-polymers by the use of Ziegler-Natta catalysts is employed on a large scale in the production of plastics having different desired technical properties. The Ziegler-Natta catalysts generally consist of a titanium(III) compound, which may be present either as a pure compound or as a crystalline solid solution containing also an aluminum compound, and an activator. Such catalyst systems usually are prepared by first reducing a titanium(IV) compound by means of organoaluminum or organomagnesium compounds to a titanium(III) compound. Suitable reducing agents are, for example, magnesium metal, Grignard compounds or magnesium dialkyls, or mixtures thereof, or aluminum metal, trialkylaluminum compounds or alkylaluminum chlorides, or mixtures thereof. After elimination of the dissolved reducing agents by washing, an organoaluminum compound of the type named above is added to the titanium(III) compound as activator.

When this general procedure is followed, the titanium(III) compound is always obtained in the form of relatively coarse particles having a diameter greater than 20μ. Now in some cases it is advisable to use the titanium component of the catalyst system in as finely divided form as possible since the smaller particle size will increase the activity of the catalyst and reduce the particle size of the polymers produced with it. Small particle size of the polymer is of importance in view of the further processing of the plastic. This is true especially of ultrahigh-molecular-weight polyolefins, in other words, polyolefins having a molecular weight, determined viscosimetrically, of over 500,000 and in particular of 1,000,000. Such polyolefins cannot be processed into shaped articles by means of the techniques usually employed with thermoplastics, such as extrusion or injection molding. They are therefore processed primarily by compression molding and sintering. In order to assure that such additives as colorants, antioxidants and UV stabilizers are uniformly distributed in the semifinished material and in the finished articles. The ultrahigh-molecular-weight polyolefins must be used in particularly finely divided form.

Many attempts have therefore been made to prepare catalysts of minute particle size. U.S. Pat. No. 2,968,652 for example, describes a method of comminuting titanium(III) compounds of a crystal size of about 25μ to a particle size ranging from about 0.1 to 5μ by ultrasonically treating the crystallized product in a neutral liquid medium. The minute particles so obtained are said to give higher yields of crystalline polymers in a shorter time than coarser catalysts do. However, the polymers produced with these catalysts are not of sufficiently small particle size, for which reason they must be subjected to a subsequent size reduction. Because of the equipment required, this method is not suited for use on an industrial scale.

Another process is described in German Pat. No. 15 95 661. There a TiCl$_3$ is used as catalyst component in the production of particulate polymers which is prepared in the presence of a rubberlike hydrocarbon polymer incorporating active oxygen atoms which contains from 0.1 to 1.0 weight percent oxygen and is dissolved in the solvent used in a proportion of from 0.01 to 1 part per part by weight of titanium tetrachloride. Recommended are all known rubberlike hydrocarbon polymers, homopolymers or copolymers, such as polyisobutylene, ethylene-propylene copolymer, polyisoprene, polybutadiene, ethylene-propylene-dicylcopentadiene terpolymers and styrene-butadiene polymer, which have been oxidized by the action of oxygen. The oxidation of such polymers may be effected by grinding for a short time at elevated temperature in an oxygen atmosphere, for example, or by prolonged storage in air.

Following the reduction of the titanium tetrachloride in the presence of the hydrocarbon polymer at temperatures not exceeding 0° C., the suspension is heated for 4 hours to 95° C. and the titanium(III) catalyst component is rinsed with fresh solvent.

The use of the rubberlike hydrocarbon polymer containing active oxygen atoms has the effect that a finely crystalline catalyst is formed. In practice, however, difficulties are encountered in connection with the production of the hydrocarbon polymers. The oxygen uptake occurs through the surface of the polymer and because of the high viscosity of the product is difficult to control so that there is no assurance that the oxygen will be homogeneously mixed with and dispersed in the polymer. In analytical tests, too, representative sampling for the purpose of determination of the oxygen content of the hydrocarbon polymer as a function of reaction time and temperature level is possible only to a limited extent. Also, it must not be overlooked in this content that the activity of the catalyst is impaired by the presence of oxygen-containing compounds.

SUMMARY OF THE INVENTION

Surprisingly, particular polymers are obtained by a process for the homo- and co-polymerization of α-olefins by the use of a catalyst system consisting of microcrystalline titanium(III) compounds produced by the reduction of titanium(IV) compounds with organoaluminum or organomagnesium compounds in a neutral solvent in which both reactants are dissolved, and of an organoaluminum compound as activator. In accordance with the new process, the reduction of the titanium(IV) compounds is carried out in the presence of from 0.2 to 5 weight percent of atactic poly-α-olefins, based on the solvent.

By atactic poly-α-olefins are meant macromolecules whose side chains are arranged randomly. In the case of poly-α-hexene, for example, the side chain is formed by a butyl group. In accordance with the preferred embodiment of the invention, the atactic poly-α-olefins used are poly-α-butene, poly-α-hexene, poly-α-octene, poly-α-decene and poly-α-dodecene. Generally speaking atactic poly-α-olefins of C$_4$H$_8$ to C$_{12}$H$_{24}$ can, in conjunction with the reduced catalyst, be used to form the particulate polymers in accordance with the invention. Preferably, the atactic poly-α-olefins have a molecular weight between 1,000 and 10,000, determined by Dampfdruckfosmometrie (Methodicum Chimicum, Vol. 1, part 2, page 658 [1973]).

They are soluble in the solvents employed for the polymerization.

A wide variety of titanium(IV) compounds are suited for use in the preparation of the titanium(III) component of the catalyst system in accordance with the invention. These include such titanium tetrahalides as $TiCl_4$, $TiBr_4$ and $TiI_4$, titanium esters of the formula $Ti(OR)_4$, mixed titanium halide esters such as $Ti(OR)_3Cl$, $Ti(OR)_3Br$, $Ti(OR)_2Cl_2$, $Ti(OR)_2Br_2$, $Ti(OR)_2I_2$, $Ti(OR)Cl_3$ and $Ti(OR)Br_3$, R standing for aliphatic and/or aromatic hydrocarbon radicals, especially hydrocarbon radicals e.g. alkyl, alkenyl and alkynyl and their cyclic counterparts as well as phenyl, naphthyl and biphenyl. Preferably, the radicals have 2 to 12 carbon atoms.

Suited for use as organoaluminum compounds in the reduction of the titanium(IV) compounds are: Aluminumtrialkyl compounds such as $Al(C_2H_5)_3$, $Al(C_3H_7)_3$ and $Al(n-C_4H_9)_3$, isoprenylaluminum, alkylaluminum halides such as $Al(C_2H_5)_2Cl$, $Al(C_2H_5)Cl_2$, $Al(C_3H_7)_2Cl$, $Al(C_3H_7)Cl_2$, $Al(n-C_4H_9)_2Cl$ and $Al(n-C_4H_9)Cl_2$, as well as mixtures of different aluminum compounds of the type named above. Organomagnesium compounds such as Grignard compounds of magnesiumdialkyls or mixtures thereto may also be used for the reduction. The aforementioned organoluminum compounds can also be used as the activators for the catalyst system consisting of titanium(III) compounds.

The preparation of the catalyst system may be effected in any neutral liquid solvent in which the titanium(IV) compounds, the organic aluminum compounds and the atactic poly-α-olefins are soluble together. Such solvents are saturated aliphatic hydrocarbons such as hexane and heptane, $C_8$ to $C_{12}$ hydrocarbon fractions, cycloaliphatic hydrocarbons, halogenated hydrocarbons from the series of aliphatic or aromatic compounds, or different mixtures of the solvents named.

The process in accordance with the invention may, for example, be carried out as follows: First the desired atactic poly-α-olefin is produced by polymerization of α-olefins by means of titanium(III) compounds and in the presence of an organoaluminum compound as activator at temperatures ranging from 30° to 120° C. and pressures from 2 to 100 bars. The finished product may then be adjusted to a desired concentration by the addition of a solvent.

The catalyst system is prepared by reducing titanium(IV) compounds by means of organoaluminum compounds in the presence of the calculated amount of atactic poly-α-olefin. On completion of the reduction, the catalyst component is rinsed with solvents at room temperature and then activated by the addition of organoaluminum compounds. From 1 to 100 mols of organoaluminum compounds are used per mol of Ti(III) compound.

The catalyst so prepared can then be used directly in the homo- and co-polymerization of α-olefins such as ethylene, propylene, butene-1, hexene-1, octene-1, decene-1 and dodecene-1. Polymerization takes place under conditions typical for the Ziegler-Natta process, namely 30° to 120° C. at 2 to 100 bars e.g. 80° C. and 4 bars. The polymer so obtained is characterized by a fine particle structure such as is desired for the further processing which follows:

EXAMPLES

1. Production of atactic poly-α-olefins

1 (a) Poly-α-hexene

In a 2-liter reaction vessel with jacket heating which has been scavenged with nitrogen, 1.6 mmols $TiCl_3$ and 16 mmols isoprenylaluminum are added to a solution heated to 40° C. of 4.0 mols hexene (about 332 g) in 500 ml of a hydrocarbon fraction (boiling point, 140° to 170° C.). For polymerization, the reaction mixture is maintained for 6 hours at 40° C. and for another 16 hours at room temperature with constant agitation. The degree of reaction is 97.4% of theory (as determined by means of the iodine number). The reaction mixture is then adjusted to a concentration of 12 weight percent by the addition of solvent. The kinematic viscosity, as determined by the Ubbe-Lohde viscosimeter (DIN 51 562), is $\gamma_{20} = 4{,}100$ centistokes (cs).

1 (b) Poly-α-octene

The production of poly-α-octene is carried out in the same manner as that of poly-α-hexene according to Example 1 (a). The degree of reaction is 96.3% of theory (as determined by means of the iodine number). The reaction mixture is then adjusted to a concentration of 12 weight percent by the addition of solvent. The kinematic viscosity is $\gamma_{20} = 3{,}900$ cs.

1 (c) Poly-α-decene

The production of poly-α-decene is carried out in the same manner as that of poly-α-hexene according to Example 1 (a). The degree of reaction is 91.8% of theory (as determined by means of the iodine number). The reaction mixture is then diluted to a concentration of 12 weight percent by the addition of solvent. The kinematic viscosity is $\gamma_{20} = 3{,}800$ cs.

1 (d) Poly-α-dodecene

The production of poly-α-dodecene is carried out in the same manner as that of poly-α-hexene according to Example 1 (a). The degree of reaction is 90.5% of theory (as determined by means of the iodine number). The reaction mixture is then adjusted to a concentration of 12 weight percent by the addition of solvent. The kinematic viscosity is $\gamma_{20} = 3{,}800$ cs.

2. Preparation of catalyst

2 (a) Comparative example

In a dry three-neck flask scavenged with nitrogen, 755 mmols diethylaluminum chloride (DEAC) is dissolved at room temperature in 1,250 ml hexane. Over a period of 4 hours, 395 mmols $TiCl_4$ dissolved in hexene ($TiCl_4$ content, 27 weight percent) is added dropwise at room temperature (20° to 25° C.) with agitation. On completion of said addition, the suspension of the titanium(III) compound is agitated for another 8 hours under $N_2$ at room temperature, and unreacted, dissolved DEAC is then eliminated by decanting and repeated washing with hexane.

Particle size of the titanium(III) compound: $>25\mu$ (as measured microscopically).

Before being used in the polymerization step, the suspension is adjusted to a concentration of 0.6 mmols Ti/liter by the addition of hexane and activated with DEAC in a 10X molar excess (referred to the titanium).

2 (b) Preparation of the titanium(III) catalyst component with addition of atactic poly-α-hexene In a dry three-neck flask scavenged with nitrogen, 755 mmols DEAC is dissolved at room temperature in 1,250 ml hexane which contains 6.84 g atactic poly-α-hexene (in accordance with Example 1 [a]). As described in Example 2 (a), TiCl₄ is then added, the suspension is agitated for 8 hours under N₂ at room temperature, and unreacted DEAC is elminated by decanting and repeated washing with hexane.

Particle size of titanium(III) compound: 1 to 10μ (as measured microscopically).

Before the suspension is used in the polymerization step, the procedure employed in Example 2 (a) is applied to it.

2 (c) Preparation of the titanium(III) catalyst component with addition of atactic poly-α-hexene In a dry three-neck flask scavenged with nitrogen, 755 mmols DEAC is dissolved at room temperature in 1,250 ml hexane which contains 7.56 g atactic poly-α-hexene (in accordance with Example 1 [a]). As described in Example 2 (a), TiCl₄ is then added, the suspension is agitated for 8 hours under N₂ at room temperature, and unreacted DEAC is eliminated by decanting and repeated washing with hexane.

Particle size of titanium(III) compound: 1 to 10μ.

Before the suspension is used in the polymerization step, the procedure employed in Example 2 (a) is applied to it.

2 (d) Preparation of titanium(III) catalyst component with addition of atactic poly-α-octene In a dry three-neck flask scavenged with nitrogen, 755 mmols DEAC is dissolved at room temperature in 1,250 ml hexane which contains 7.56 g atactic poly-α-octene (in accordance with Example 1 [b]). As described in Example 2 (a), TiCl₄ is then added, the suspension is agitated for 8 hours under N₂ at room temperature, and unreacted DEAC is eliminated by decanting and repeated washing with hexane.

Particle size of titanium(III) compound: 1 to 10μ.

Before the suspension is used in the polymerization step, the procedure employed in Example 2 (a) is applied to it.

2 (e) Preparation of titanium(III) catalyst component with addition of atactic poly-α-decene In a dry three-neck flask scavenged with nitrogen, 755 mmols DEAC is dissolved at room temperature in 1,250 ml hexane which contains 7.56 g atactic poly-α-decene (in accordance with Example 1 [c]). As described in Example 2 (a), TiCl 4 is then added, the suspension is agitated for 8 hours under N₂ at room temperature, and unreacted DEAC is eliminated by decanting and repeated washing with hexane.

Particle size of titanium(III) compound: 1 to 10μ.

Before the suspension is used in the polymerization step, the procedure employed in Example 2 (a) is applied to it.

2 (f) Preparation of titanium(III) catalyst component with addition of atactic poly-α-dodecene In a dry three-neck flask scavenged with nitrogen, 755 mmols DEAC is dissolved at room temperature in 1,250 ml hexane which contains 7.56 g atactic poly-α-dodecene (in accordance with Example 1 [d]). As described in Example 2 (a), TiCl₄ is then added, the suspension is agitated for 8 hours under N₂ at room temperature, and unreacted DEAC is eliminated by decanting and repeated washing with hexane.

Particle size of titanium(III) compound: 1 to 10μ.

Before the suspension is used in the polymerization step, the procedure employed in Example 2 (a) is applied to it.

3. Discontinuous polymerization

3 (a) Comparative example

Catalyst production without addition of an atactic poly-α-olefin in accordance with ample 2 (a), activation by the use of a 10× molar excess of DEAC (referred to the titanium).

The catalyst produced in accordance with Example 2 (a) is heated in an amount of 0.5 mmol (based on the titanium) to 80° C. with agitation in a dry 3-liter pressure reactor with jacket heating, scavenged with nitrogen, together with 2 liters of a hydrocarbon fraction (boiling point, 140° to 170° C.). Ethylene is then injected up to a total pressure of 4 bars and this pressure is maintained during the 5-hour reaction time by the addition of ethylene. The polymerization is then discontinued by the addition of isopropanol.

Catalyst usage: 1.1 mmols Ti/kg polyethylene.

3 (b) Polymerization by the use of a catalyst prepared in the presence of atactic poly-α-hexene 3 (b¹) Catalyst from Example 2 (b)
Test run in accordance with 3 (a)
Catalyst usage: 1.0 mmol Ti/kg polyethylene
3 (b²) Catalyst from Example 2 (c)
Test run in accordance with 3 (a)
Catalyst usage: 0.9 mmol Ti/kg polyethylene

3 (c) Polymerization by the use of a catalyst prepared in the presence of atactic poly-α-octene Catalyst from Example 2 (d)
Test run in accordance with Example 3 (a)
Catalyst usage: 1.5 mmols Ti/kg polyethylene

3 (d) Polymerization by the use of a catalyst prepared in the presence of atactic poly-α-decene Catalyst from Example 2 (e)
Test run in accordance with Example 3 (a)
Catalyst usage: 1.6 mmols Ti/kg polyethylene

3 (e) Polymerization by the use of a catalyst prepared in the presence of atactic poly-α-dodecene Catalyst from Example 2 (f)
Test run in accordance with Example 3 (a)
Catalyst usage: 1.0 mmol Ti/kg polyethylene The results of these test are presented in Table 1 which follows.

TABLE 1

| Example | Poly-α-olefin used | Screen analysis (dia. in mm) in weight percent (DIN 4188) | | | | |
|---|---|---|---|---|---|---|---|
| | | >1.0 | >0.5 | >0.25 | >0.1 | >0.63 | >0.63 |
| 3 (a) | — | 0.5 | 0.5 | 10.5 | 86.5 | 2.0 | Traces |
| 3 (b¹) | Poly-α-hexene | Traces | 1.5 | 2.0 | 31.0 | 62.0 | 3.5 |
| 3 (b²) | Poly-α-hexene | 0.5 | 0.5 | 1.5 | 22.5 | 57.0 | 18.0 |
| 3 (c) | Poly-α-octene | Traces | 0.5 | 0.5 | 24.0 | 40.5 | 34.5 |
| 3 (d) | Poly-α-decene | 0.5 | 0.5 | 0.5 | 11.0 | 39.0 | 48.5 |

TABLE 1-continued

| Example | Poly-α-olefin used | Screen analysis (dia. in mm) in weight percent (DIN 4188) | | | | | |
|---|---|---|---|---|---|---|---|
| | | >1.0 | >0.5 | >0.25 | >0.1 | >0.63 | >0.63 |
| 3 (e) | Poly-α-dodecene | 0.5 | 0.5 | 0.5 | 6.0 | 38.5 | 54.0 |

4. Continuous polymerization

4 (a) Comparative example

Into a 47-liter double-walled pressure reactor filled with hexane there are introduced continuously at 80° C. and a total pressure of 4 bars 940 liters ethylene, from 0.8 to 1.0 liter hydrogen, and 1.2 liters contact solution prepared in accordance with Example 2 (a).

Catalyst usage: 0.8 mmol Ti/kg polyethylene.

4 (b) Polymerization by the use of a catalyst prepared in the presence of atactic poly-α-hexene 4 (b¹) Catalyst from Example 2 (b)
  Test run in accordance with Example 4 (a)
  Catalyst usage: 0.9 mmol Ti/kg polyethylene
4 (b²) Catalyst from Example 2 (c)
  Test run in accordance with Example 4 (a)
  Catalyst usage: 0.5 mmol Ti/kg polyethylene The results of these tests are presented in Table 2 which follows.

What is claimed is:

1. In a process for the homo- and co-polymerization of a α-olefin at 30° to 120° C. and 2 to 100 bars in the presence a catalyst system comprising a microcrystalline titanium(III) compound prepared by the reduction of a titanium(IV) compound with an organoaluminum or organomagnesium compound in a neutral organic solvent which dissolves both reactants, and of an organoaluminum compound as activator, the improvement wherein the reduction of the titanium(IV) compound is effected in the presence of from 0.2 to 5 weight percent of an atactic poly-α-olefin, based on the weight of the solvent.

2. A process according to claim 1, wherein poly-α-butene, poly-α-hexene, poly-α-octene, poly-α-decene or poly-α-dodecene is used as the atactic poly-α-olefin.

3. A process according to claim 1, wherein the titanium(IV) compound is selected from the group consisting of TiCl$_4$, TiBr$_4$, TiI$_4$, Ti(OR)$_4$, Ti(OR)$_3$Cl, Ti(OR)$_3$BR$_3$, Ti(OR)$_2$Cl$_2$, Ti(OR)$_2$Br$_2$, Ti(OR)$_2$I$_2$, Ti(OR)Cl$_3$ and Ti(OR)Br$_3$ where R represents an aliphatic or aromatic hydrocarbon radical.

TABLE 2

| Example | Poly-α-olefin used | Screen analysis (dia. in mm) in wt. % (DIN 4188) | | | | | | RSV value (dl/g) (ISO R1191) | Creep strength N/mm$^2$ (DIN 53453) | Notch impact strength mJ/mm$^2$ (DIN 53453) | Bulk density (g/l) (DIN 53468) | |
|---|---|---|---|---|---|---|---|---|---|---|---|---|
| | | >1.0 | >0.5 | >0.25 | >0.1 | >0.63 | >0.63 | | | | | |
| 4 (a) | — | 2.0 | 2.5 | 41.5 | 53.5 | 0.5 | 0 | 23.8 | 0.27 | (1) 152 | 455 | |
| | | | | | | | | | | | (2) 211 | |
| 4 (b¹) | Poly-α-hexene | 1.5 | 2.5 | 3.0 | 59.0 | 30.0 | 4.0 | 23.3 | 0.28 | (1) 159 | 450 | |
| | | | | | | | | | | | (2) 209 | |
| 4 (b²) | Poly-α-hexene | 1.5 | 3.0 | 2.5 | 71.0 | 20.5 | 1.5 | 22.4 | 0.24 | (1) 172 | 320 | |
| | | | | | | | | | | | (2) 258 | |

(1) = Single notch
(2) = Double notch
DIN = Deutsche Industry Norm
RSV = Reduced Specific Viscosity
ISO R1191 = International Organization for Standardization

* * * * *